United States Patent
Chuang et al.

(10) Patent No.: US 7,831,060 B2
(45) Date of Patent: Nov. 9, 2010

(54) METHOD FOR PROTECTING CONTENT OF VECTOR GRAPHICS FORMATS

(75) Inventors: Yueh-Cheng Chuang, Chiayi (TW); Wen-Hsiang Tsai, Hsinchu (TW); Yu-Chen Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 1103 days.

(21) Appl. No.: 11/498,078

(22) Filed: Aug. 3, 2006

(65) Prior Publication Data

US 2007/0147655 A1 Jun. 28, 2007

(30) Foreign Application Priority Data

Dec. 28, 2005 (TW) ................. 94146990 A (51) Int. Cl.
*G06K 9/00* (2006.01)
*H04N 7/167* (2006.01)
*H04L 9/32* (2006.01)

(52) U.S. Cl. ............... 382/100; 382/112; 380/201; 713/176

(58) Field of Classification Search .......... 382/100, 382/112, 232, 212; 380/200, 210; 713/176
See application file for complete search history.

(56) References Cited

U.S. PATENT DOCUMENTS

| | | | | |
|---|---|---|---|---|
| 5,960,081 A * | 9/1999 | Vynne et al. | ............... | 713/176 |
| 6,330,672 B1 * | 12/2001 | Shur | ............... | 713/176 |
| 6,625,297 B1 * | 9/2003 | Bradley | ............... | 382/100 |
| 6,687,383 B1 * | 2/2004 | Kanevsky et al. | ............... | 382/100 |
| 6,885,757 B2 * | 4/2005 | Bloom et al. | ............... | 382/100 |
| 6,915,020 B2 * | 7/2005 | Damera-Venkata et al. | . | 382/253 |
| 7,000,113 B1 * | 2/2006 | Linnartz | ............... | 713/176 |
| 7,100,050 B1 * | 8/2006 | Coppersmith et al. | ........ | 713/176 |
| 7,142,691 B2 * | 11/2006 | Levy | ............... | 382/100 |
| 7,370,363 B2 * | 5/2008 | Kanai et al. | ............... | 726/26 |
| 7,391,880 B2 * | 6/2008 | Reed et al. | ............... | 382/100 |
| 7,489,801 B2 * | 2/2009 | Sharma et al. | ............... | 382/100 |
| 7,515,730 B2 * | 4/2009 | Tian et al. | ............... | 382/100 |
| 7,542,587 B2 * | 6/2009 | Tian et al. | ............... | 382/100 |
| 7,668,312 B2 * | 2/2010 | Lecomte et al. | ............... | 380/210 |
| 2001/0049788 A1 * | 12/2001 | Shur | ............... | 713/179 |
| 2001/0054150 A1 * | 12/2001 | Levy | ............... | 713/176 |

(Continued)

OTHER PUBLICATIONS

Ohbuchi et al. "A Shape Preserving Data Embedding Algorithm for NURBS Curves and Surfaces" Computer Graphics International (1999) Canmore, Canada, Jun. 4-Jun. 11, 2009. pp. 1-8.*

(Continued)

*Primary Examiner*—Charles Kim
*Assistant Examiner*—Mia M Thomas
(74) *Attorney, Agent, or Firm*—Rabin & Berdo, P.C.

(57) ABSTRACT

A method for protecting content of vector graphics formats is provided. A first vector graphics is scrambled to generate a second vector graphics. Then a plurality of pixel samplings are performed by the first vector graphics which generating at least a recovery information object according to a predetermined graphics. The predetermined graphics is watermarked to generate a watermark object. And the recovery information object is encoded and embedded in the watermark object to generate a recovery information watermark. Finally, the second vector graphics, the recovery information watermark, and the recovery code are combined to generate a protected first vector graphics.

7 Claims, 8 Drawing Sheets

U.S. PATENT DOCUMENTS

| | | | |
|---|---|---|---|
| 2002/0158879 A1* | 10/2002 | Broghammer et al. | 345/555 |
| 2003/0032033 A1* | 2/2003 | Anglin et al. | 435/6 |
| 2003/0038738 A1* | 2/2003 | Oktem et al. | 341/87 |
| 2003/0047612 A1* | 3/2003 | Shaked et al. | 235/462.1 |
| 2003/0098862 A1* | 5/2003 | Hunt et al. | 345/418 |
| 2003/0179900 A1* | 9/2003 | Tian et al. | 382/100 |
| 2003/0202678 A1* | 10/2003 | Silverstein | 382/100 |
| 2004/0057598 A1* | 3/2004 | Bradley | 382/100 |
| 2005/0025335 A1* | 2/2005 | Bloom et al. | 382/100 |
| 2005/0132025 A1* | 6/2005 | Tsai et al. | 709/219 |
| 2005/0175216 A1* | 8/2005 | Bloom et al. | 382/100 |
| 2006/0066625 A1* | 3/2006 | LeComte et al. | 345/547 |
| 2006/0075241 A1* | 4/2006 | Deguillaume et al. | 713/176 |
| 2007/0177761 A1* | 8/2007 | Levy | 382/100 |
| 2008/0085031 A1* | 4/2008 | Estevez et al. | 382/100 |

OTHER PUBLICATIONS

Yan et al. Scrambling of Engineering Drawings—ICME 2003, 2003, pp. 1-5.*

Kung et al. "Video Watermarking Using Motion Vector" 16th IPPR Conference on Computer Vision, Graphics and Image Processing (CVGIP Aug. 17-19, 2003) pp. 1-5.*

Chang et al. "Adaptive Watermark mechanism for rightful ownership protection" Journal of Systems and Software 81 (2007) pp. 1118-1129.*

Huang et al. "Watermarking Still Images Using Parametrized Wavelet Systems" Proceedings of Image and Vision (2003) pp. 1-6.*

* cited by examiner

METHOD FOR PROTECTING CONTENT OF VECTOR GRAPHICS FORMATS

CROSS-REFERENCE TO RELATED APPLICATIONS

This non-provisional application claims priority under 35 U.S.C. §119(a) on patent application Ser. No(s). 094146990 filed in Taiwan, R.O.C. on Dec. 28, 2005 the entire contents of which are hereby incorporated by reference.

BACKGROUND OF THE INVENTION

1. Field of Invention

The present invention relates to a method for protecting content of graphics, and more particularly, to a method for protecting content of vector graphics formats.

2. Related Art

A vector graphics format comprises a geometric description of all the shapes, and all the attributes thereof, including color, size, thickness of the contour lines, etc., in an image, and the vector graphics thereof can be zoomed. Compared with the conventional dot matrix format, graphics adopting this specification are easy to be read and operated, and when represented in different resolutions or magnification coefficients, excellent quality of the graphics can be maintained, and the document is relatively small. Therefore, this graphics format is widely applied at present.

However, for the vector graphics format, unless the format has a particularly designed protection method, the content file is easy to be stolen or embezzled by recovery engineering since the file format is open. The prior protection methods are introduced as follows.

1. The user is made to download in a manner similar to streaming, and cannot obtain the register file. The disadvantage of this method lies in that the user cannot obtain the content file and the server must be connected through the network when playing the content file.

2. The content of the script is obfuscated such that it is very difficult for the user to understand the program logic directly. The disadvantage of this method lies in that the content file can still be used and played.

3. A compatible player is additionally manufactured and a private specific format is placed in the open file. The disadvantage of this method lies in that the user needs to download the player additionally.

In light of the above mentioned problems, there is no effective and easy protection method for the vector graphics existing generally on the network currently. Therefore, the content protection of the vector graphics format has gradually become a topic worthy of concern.

SUMMARY OF THE INVENTION

In view of the above problems, a main object of the present invention is to provide a method for protecting content of vector graphics formats.

The method of the present invention comprises the following steps. First, a first vector graphics is scrambled to generate a second vector graphics. Then a plurality of pixel samplings are performed by the first vector graphics which generating at least a recovery information object according to a predetermined graphics. The predetermined graphics is watermarked to generate a watermark object. And the recovery information object is encoded and embedded in the watermark object to generate a recovery information watermark. Finally, the second vector graphics, the recovery information watermark, and recovery code of the recovery information are combined to generate a protected first vector graphics.

In comparison to the prior art, the present invention can protect the digital content besides the script in the content file, being unnecessary to install additional decoding or recovery programs. Even if the register file is obtained, the interactive content cannot be used without the golden key. Furthermore, the watermark of the present invention has the effect of announcing and alarming.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

It is to be understood that both the foregoing general description and the following detailed description are exemplary, and are intended to provide further explanation of the invention as claimed.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Features and embodiments of the present invention will be described in detail below through most preferable embodiments accompanied with the drawings.

Figure 1:
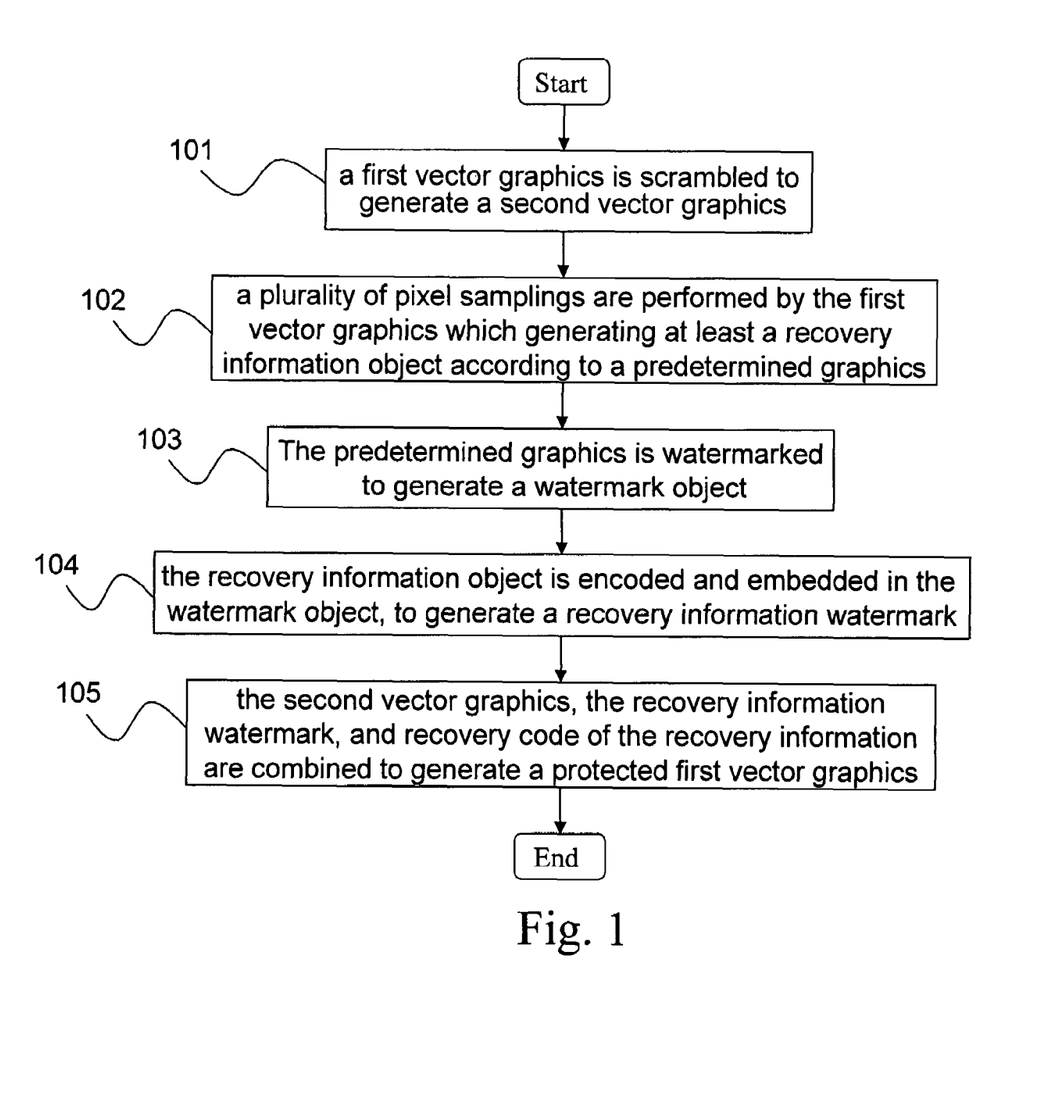
FIG. 1 is a flowchart of a method for protecting content of vector graphics formats according to the present invention.

FIG. 1 is a flowchart of a method for protecting content of vector graphics formats according to the present invention. As shown in FIG. 1, a first vector graphics is scrambled to generate a second vector graphics (Step 101). Then a plurality of pixel samplings are performed by the first vector graphics which generating at least a recovery information object according to a predetermined graphics (Step 102). The predetermined graphics is watermarked to generate a watermark object (Step 103). And the recovery information object is encoded and embedded in the watermark object, to generate a recovery information watermark (Step 104). Finally, the second vector graphics, the recovery information watermark, and recovery code of the recovery information are combined to generate a protected first vector graphics (Step 105).

The vector graphics format provided by the present invention is applied in an interactive multimedia file, e.g. those of SVG, SWF, or other formats. And it is suitable for being used in all the Time Base or Frame base objects.

Figure 2:
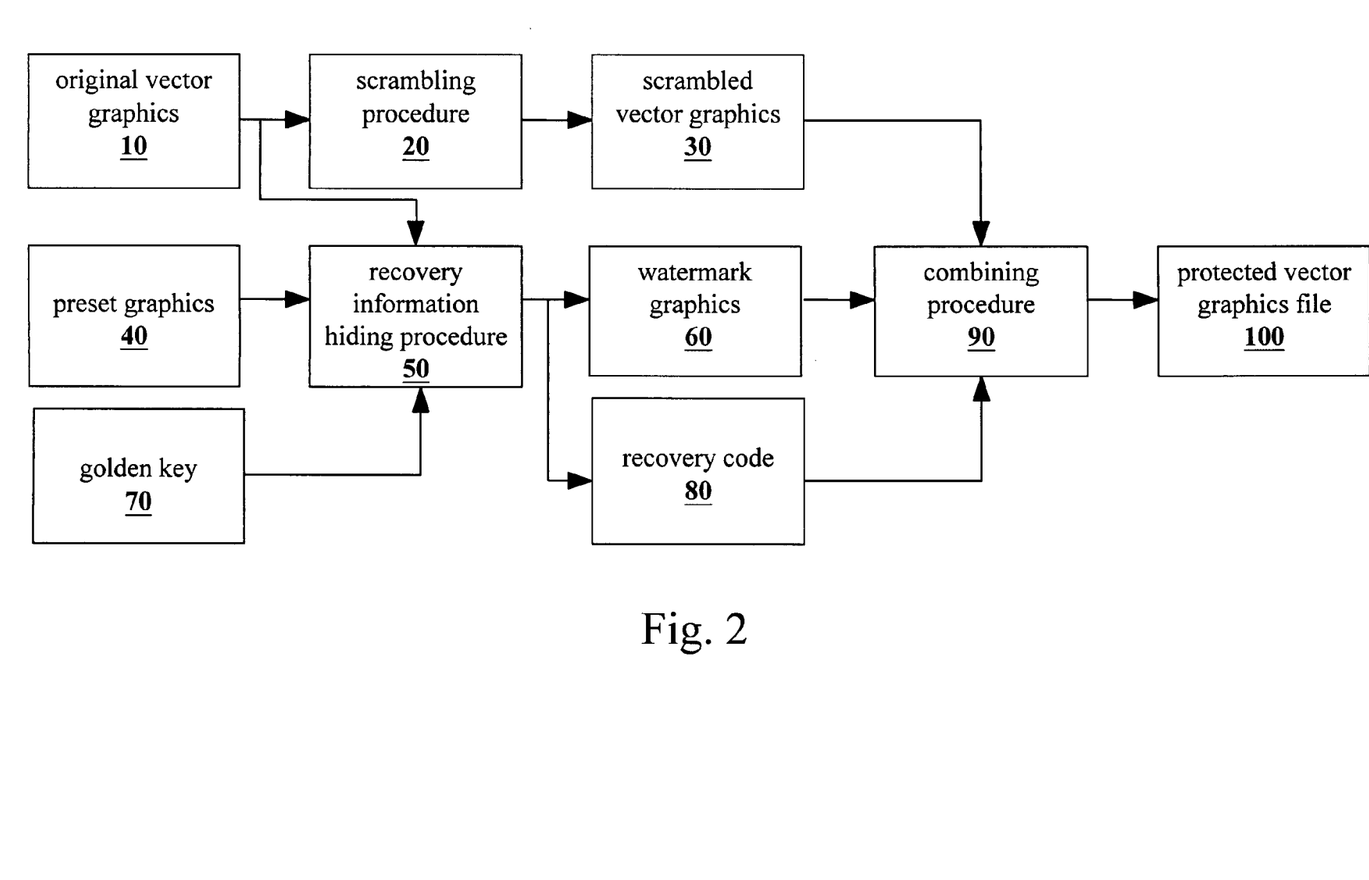
FIG. 2 is a block diagram of an encoding terminal of the method for protecting content of vector graphics formats according to the present invention.

FIG. 2 is a block diagram of an encoding terminal of the method for protecting content of vector graphics formats according to the present invention. The method of the present invention is first to generate a scrambled vector graphics 30 after an original vector graphics 10 is scrambled through a scrambling procedure 20. Then, to generate a watermark graphics 60 after a predetermined graphics 40 is processed through a recovery information hiding procedure 50. A golden key 70 is served as the encoding key of the recovery information hiding procedure 50, and a recovery code 80 is a password relative to the golden key 70. After the recovery code 80, the scrambled vector graphics 30, and the watermark graphics 60 are combined through a combining procedure 90, a protected vecetor graphics file 100 is generated finally. A user only needs to input the correct password of the golden key 70, the original vector graphics 10 will be recovered, without using additional recovery programs.

The scrambling procedure 20, the recovery information hiding procedure 50, and the combining procedure 90 will be respectively described in detail below to prove the feasibility of the present invention.

Figure 3A:
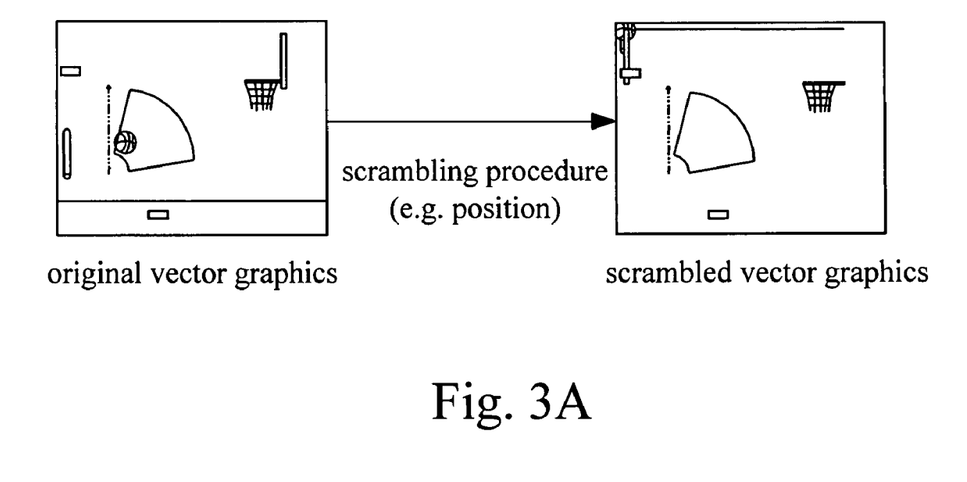
FIGS. 3A, 3B are schematic views of a scrambling procedure.
Figure 3B:
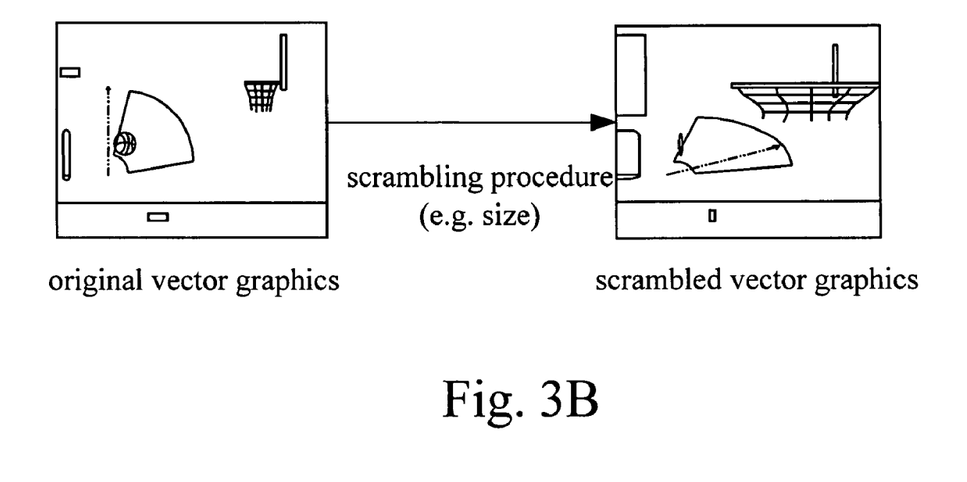

Please refer to FIGS. 3A and 3B, FIGS. 3A and 3B are schematic views of the scrambling procedure. After the original vector graphics has been scrambled, FIG. 3A will become a viewable content with an incorrect picture position which cannot be used normally, and FIG. 3B will become a viewable content with an incorrect picture size which cannot be used normally. The practical approaches of the present scrambling procedure 20 are not limited to scrambling the position and size, however, and, for example, color conversion, rotation, and other attributes can also be scrambled, and combinations of two or more attributes can also be scrambled. The description of the present embodiment is not to be used to limit the application scope of the present invention.

Figure 4:
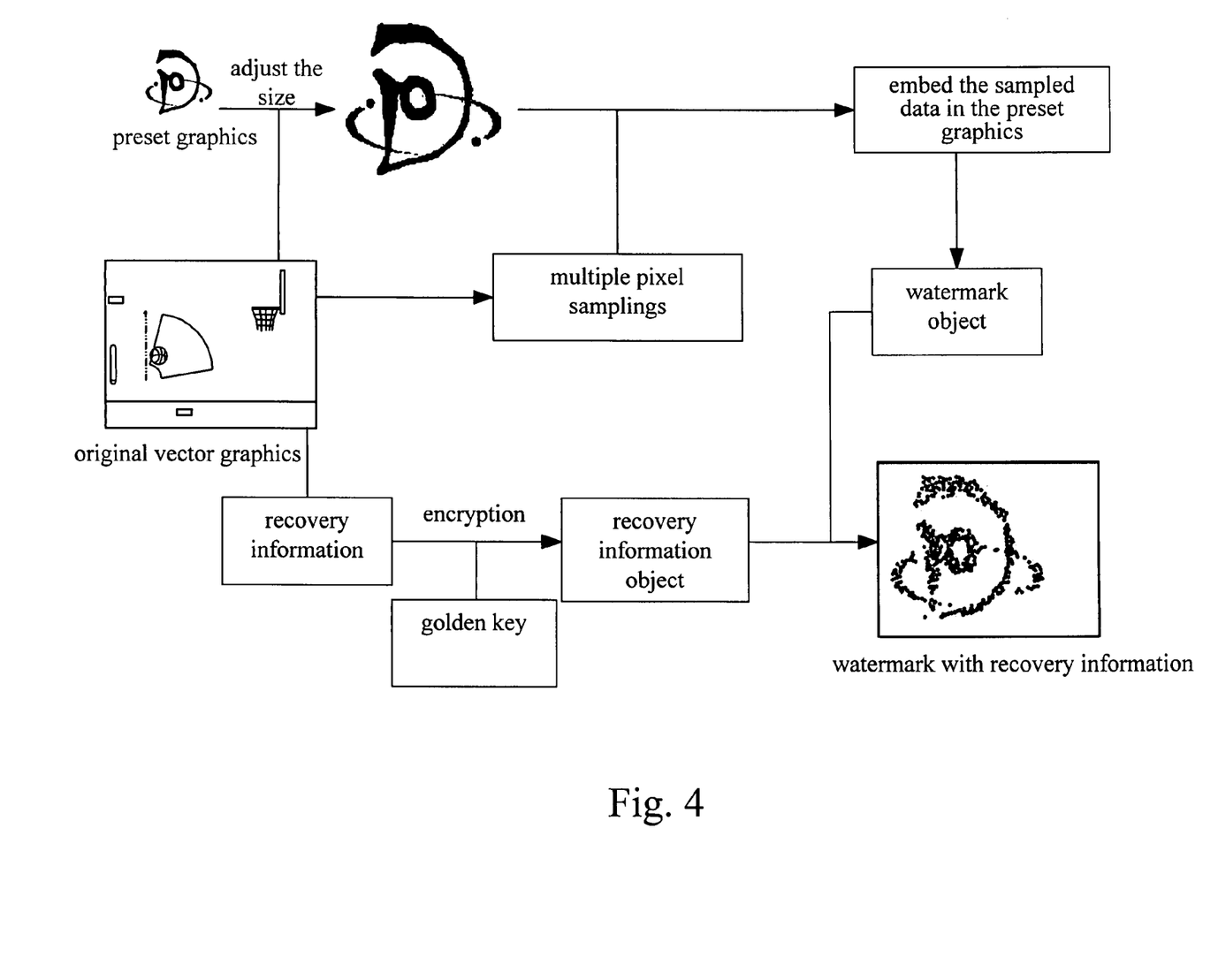
FIG. 4 is a flowchart of a recovery information hiding procedure according to the present invention.

FIG. 4 is a flowchart of a recovery information hiding procedure according to the present invention. As shown in FIG. 4, the size of a predetermined graphics is first adjusted to accord with the size of the original vector graphics. But this step is not necessary. If the size of the selected predetermined graphics is too small, it is necessary to magnify it to cover the original vector graphics, so as to hide the information. The predetermined graphics can be generally selected from Logo graphics, to honor the copyright, but this is not to limit the application scope of the present invention. Then a plurality of pixel samplings are performed by the original vector graphics which generating at least a recovery information object according to the predetermined graphics. And the number of samples is embedded into the predetermined graphics and then watermarked to generate a watermark object.

Meanwhile, feature extraction of the recovery information (attribute) is performed on the original vector graphics, and a recovery information object is generated through data encryption. Then the recovery information object is embedded into the watermark object, so as to generate a watermark with recovery information.

Either the watermark object or the recovery information object has attributes capable of affecting the display of the original vector graphics, such as X coordinate, Y coordinate, length, width, and size. And the description language of the vector graphics format can be used to read attributes such as sprite instance in the Macromedia Flash format, <use> and <g> in the SVG format, or Transform2 D after being named by the DEF in MPEG-4 BIFS format. And there are various types of data encryption, for example, XOR binary operation performed through the Key, or bit shifting of the value of Key performed for the original data. There are various methods for hiding data in the recovery information object, for example, the size between paired attributes can be used to represent 0 or 1, or the original data is divided in a Binary manner and stored respectively on different attributes, or the like. The above cited detailed description comprises only preferred practical embodiments. It is not to be used to limit the application scope of the present invention, and all the suitable attribute definitions, encryption manners, and hiding methods do not deviate from the application scope of the present invention.

Figure 5:
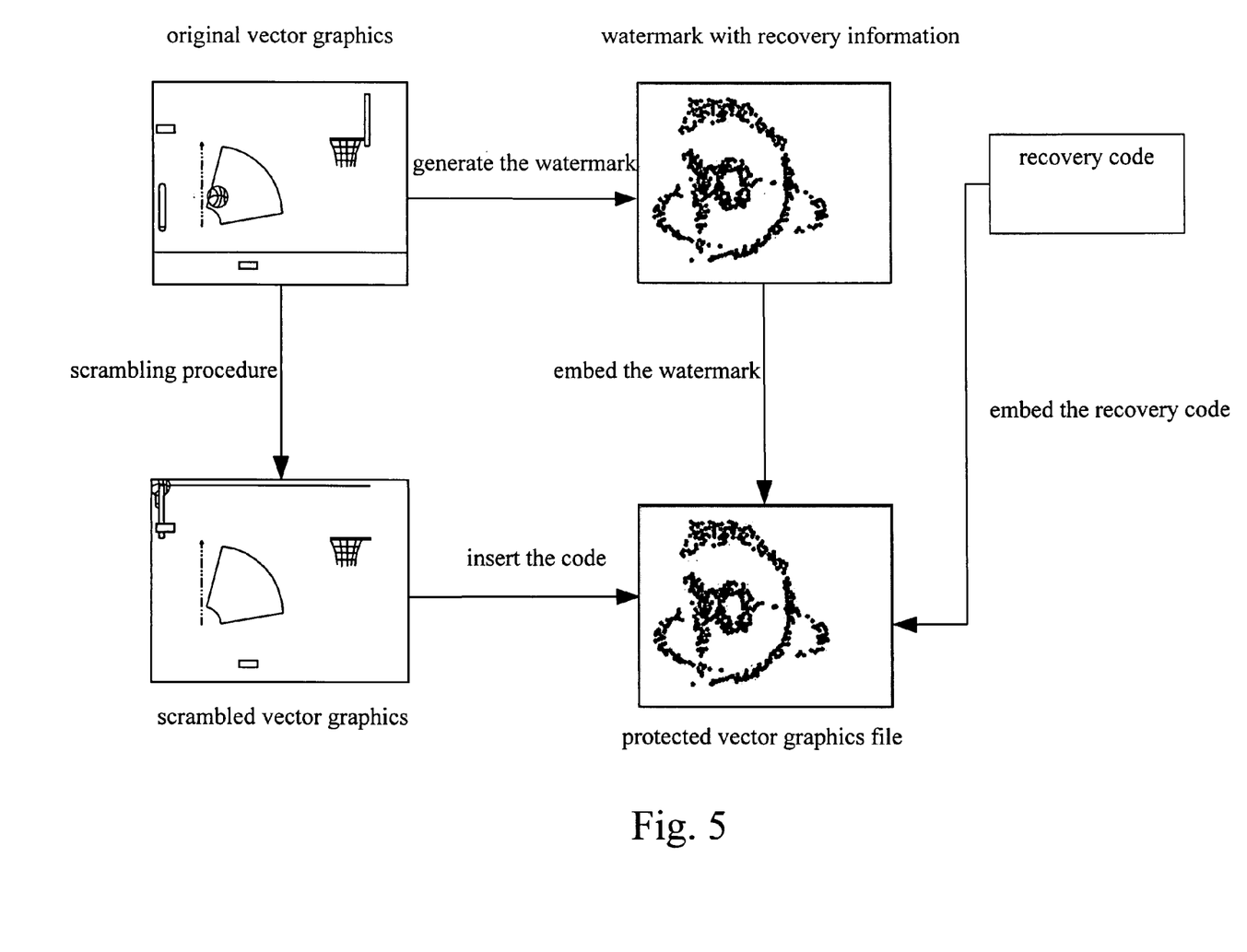
FIG. 5 is a flowchart of a combining procedure according to the present invention.

FIG. 5 is a flowchart of a combining procedure according to the present invention. The combining procedure 90 combines the scrambling procedure 20, the recovery information hiding procedure 50, and the encoding procedure, so as to generate the protected vector graphics file 100. First, the recovery information object is obtained from the original vector graphics 10. Then the recovery information object is embedded and hidden in the watermark object through the step of generating the watermark to generate a watermark with recovery information 60. Meanwhile, the original vector graphics 10 is scrambled with the scrambling procedure 20. Finally, the recovery code 80 of the recovery information and the watermark with recovery information are embedded into the scrambled vector graphics 30, so as to generate a protected vector graphics file 100.

Figure 6:
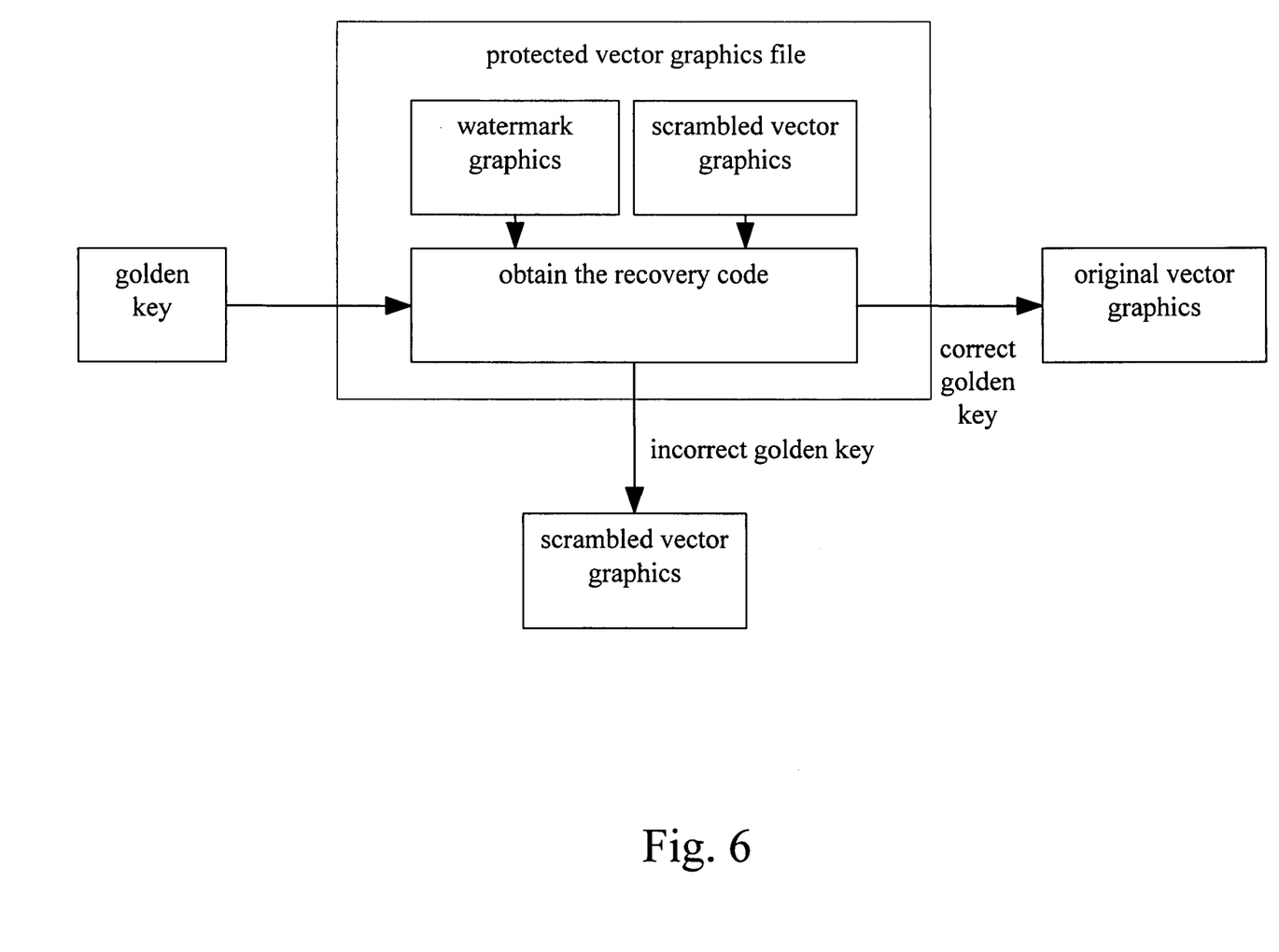
FIG. 6 is an architectural view of protecting and recovering the content of the vector graphics formats according to the present invention.

FIG. 6 is an architectural view of protecting and recovering the content of the vector graphics formats according to the present invention. Besides the file of the vector graphics format, an additional recovery program is not necessarily used. The display of the original vector graphics 10 will be obtained after the correct golden key has been input. Otherwise, there will be an incorrect display because of the incorrect recovery information.

Figure 7:
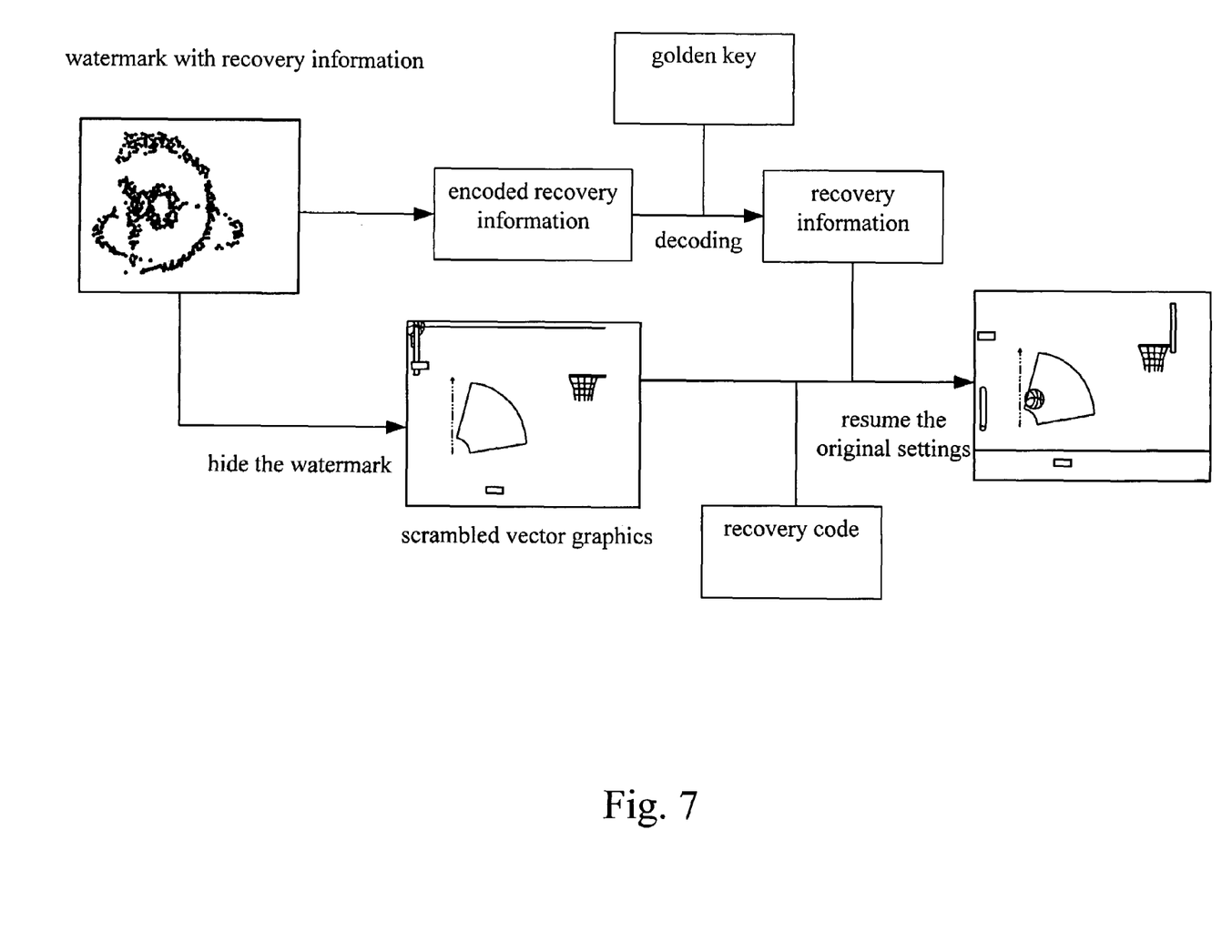
FIG. 7 is a flowchart of protecting and recovering the content of the vector graphics formats according to the present invention.

FIG. 7 is a flowchart of protecting and recovering the content of the vector graphics formats according to the present invention. As shown in FIG. 7, after the encrypted recovery information is obtained from the protected vector graphics file, the encrypted recovery information is decrypted, so as to obtain a recovery information. Then after the protected vector graphics file is converted to a scrambled vector graphics, i.e. after hiding the watermark, the display of the original vector graphics will be recovered with the recovery code corresponding to the recovery information.

Figure 8:
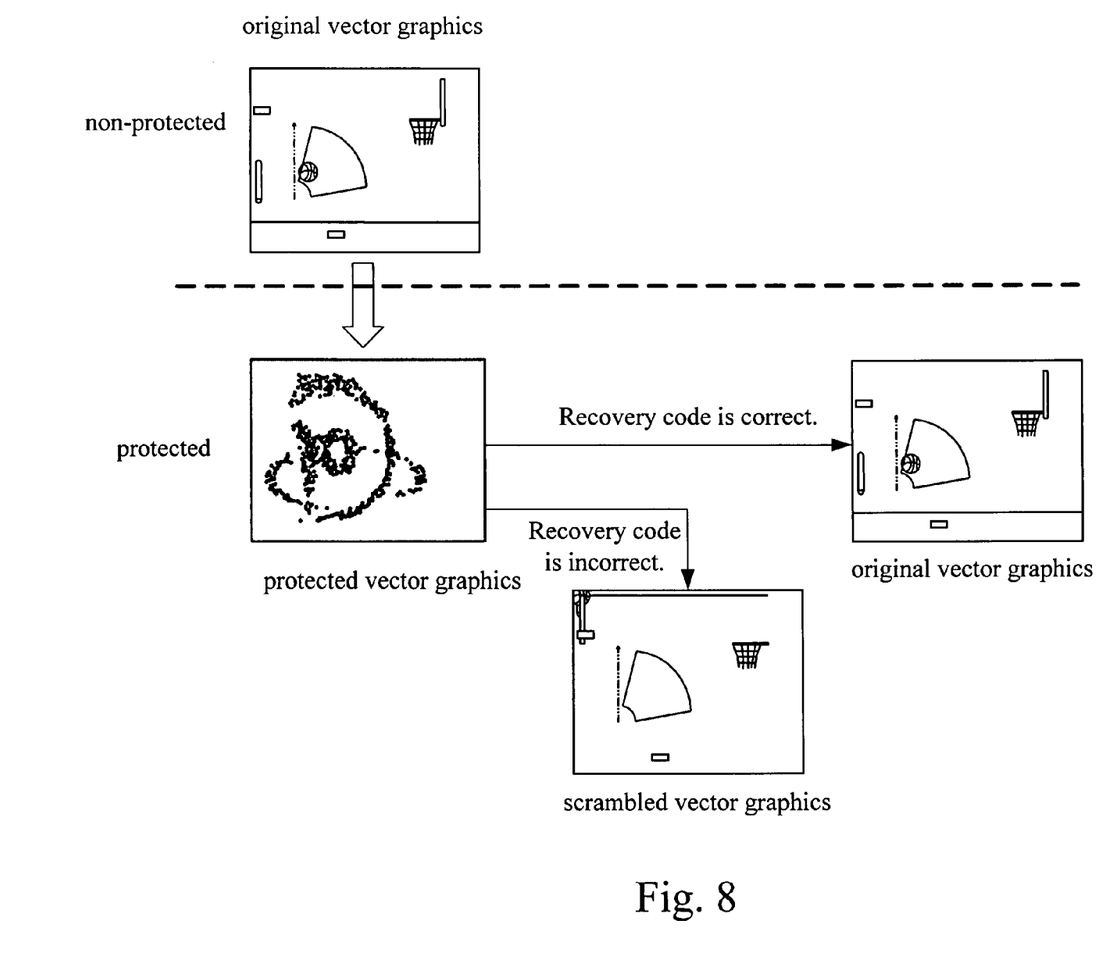
FIG. 8 is a schematic view of the preferred embodiment according to the present invention.

FIG. 8 is a schematic view of an embodiment according to the present invention. After the original vector graphics is processed with the protecting method according to the present invention, a protected vector graphics is formed. A user need only input the correct recovery code to use the original vector graphics, without having to install additional decoding or recovery programs.

In comparison to the prior art, the present invention can protect the digital content besides the script in the content file, being unnecessary to install additional decoding or recovery programs. Even if the register file is obtained, the interactive content cannot be used normally without the golden key. Furthermore, the watermark of the present invention has the effect of announcing and alarming.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for protecting content of vector graphics formats, comprising:

scrambling a first vector graphics to generate a second vector graphics by a scrambling procedure, wherein the scrambling procedure is performed to modify at least one attribute of the first vector graphics;

performing a plurality of pixel samplings by the first vector graphics which generating at least a recovery information object according to a predetermined graphics;

watermarking the predetermined graphics to generate a watermark object;

encoding the recovery information object and embedding it in the watermark object to generate a recovery information watermark; and combining the second vector graphics, the recovery information watermark, and a recovery code of the recovery information object to generate a protected first vector graphics.

2. The method for protecting content of vector graphics formats as claimed in claim 1, wherein the at least one attribute comprises position, size, color conversion, or rotation.

3. The method for protecting content of vector graphics formats as claimed in claim 1, wherein the preset graphics is a Logo graphics.

4. The method for protecting content of vector graphics formats as claimed in claim 1, wherein the recovery information object and the watermark object are read by a description language of the vector graphics format to describe the at least one attribute of the first vector graphics.

5. The method for protecting content of vector graphics formats as claimed in claim 1, wherein it is suitable for being used in an interactive multimedia file format.

6. The method for protecting content of vector graphics formats as claimed in claim 5, wherein the interactive multimedia file format is an SVG format.

7. The method for protecting content of vector graphics formats as claimed in claim 5, wherein the interactive multimedia file format is an SWF format.

* * * * *